(12) United States Patent
Lisuk et al.

(10) Patent No.: US 12,174,800 B2
(45) Date of Patent: Dec. 24, 2024

(54) MODEL OBJECT MANAGEMENT AND STORAGE SYSTEM

(71) Applicant: Palantir Technologies Inc., Denver, CO (US)

(72) Inventors: David Lisuk, New York, NY (US); Daniel Erenrich, Mountain View, CA (US); Guodong Xu, Shoreline, WA (US); Luis Voloch, Brooklyn, NY (US); Rahul Agarwal, New York, NY (US); Simon Slowik, London (GB); Aleksandr Zamoshchin, San Francisco, CA (US); Andre Frederico Cavalheiro Menck, New York, NY (US); Anirvan Mukherjee, New York, NY (US); Daniel Chin, Mountain View, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/415,253

(22) Filed: Jan. 17, 2024

(65) Prior Publication Data

US 2024/0152490 A1     May 9, 2024

Related U.S. Application Data

(63) Continuation of application No. 18/051,035, filed on Oct. 31, 2022, now Pat. No. 11,907,175, which is a
(Continued)

(51) Int. Cl.
    *G06F 16/00*      (2019.01)
    *G06F 16/13*      (2019.01)
(Continued)

(52) U.S. Cl.
     CPC .......... *G06F 16/1873* (2019.01); *G06F 16/13* (2019.01); *G06F 16/196* (2019.01);
(Continued)

(58) Field of Classification Search
     CPC .. G06F 16/1873; G06F 2111/20; G06F 16/13; G06F 16/196; G06F 30/00; G06N 7/00
     See application file for complete search history.

(56) References Cited

U.S. PATENT DOCUMENTS

2015/0363435 A1*   12/2015   Ott ........................ G06F 16/212
                                                                   707/803

OTHER PUBLICATIONS

Goyal et al., "A Detailed Analysis of Data Consistency Concepts in Data Exchange Formats (JSON & XML)," International Conference on Computing, Communication and Automation (ICCCA2017), 2017, pp. 72-77. (Year: 2017).*
(Continued)

*Primary Examiner* — Cheryl Lewis
(74) *Attorney, Agent, or Firm* — Faegre Drinker Biddle & Reath LLP

(57) ABSTRACT

A model management system provides a centralized repository for storing and accessing models. The model management system receives an input to store a model object in a first model state generated based on a first set of known variables. The model management system generates a first file including a first set of functions defining the first model state and associates the first file with a model key identifying the model object. The model management system receives an input to store the model object in a second model state having been generated based on the first model state and a second set of known variables. The model management system generates a second file including a second set of functions defining the second model state and associates the second file with the model key. The model management
(Continued)

system identifies available versions of the model object based on the model key.

20 Claims, 5 Drawing Sheets

Related U.S. Application Data continuation of application No. 17/093,381, filed on Nov. 9, 2020, now Pat. No. 11,526,471, which is a continuation of application No. 15/891,493, filed on Feb. 8, 2018, now Pat. No. 10,866,936.

(60) Provisional application No. 62/478,372, filed on Mar. 29, 2017.

(51) Int. Cl.
*G06F 16/18* (2019.01)
*G06F 16/188* (2019.01)
*G06F 30/00* (2020.01)
*G06N 7/00* (2023.01)
*G06F 111/20* (2020.01)

(52) U.S. Cl.
CPC ............... *G06F 30/00* (2020.01); *G06N 7/00* (2013.01); *G06F 2111/20* (2020.01)

(56) References Cited

OTHER PUBLICATIONS

Kereshmeh Afsari et al., "JavaScript Object Notation (JSON) Data Serialization for IFC Schema in Web-Based BIM Data Exchange," Elsevier, www.elsevier.com/locate/autcon, pp. 24-51, ScienceDirect, 2017. (Year: 2017).*

Edman Anjos et al., "SJSON: A Succinct Representation for JavaScript Object Notation Documents," The Eleventh International Conference on Digital Information Management (ICDIM 2016), pp. 173-178. (Year: 2016).*

* cited by examiner

MODEL OBJECT MANAGEMENT AND STORAGE SYSTEM

PRIORITY APPLICATION

This application is a continuation of U.S. patent application Ser. No. 18/051,035, filed Oct. 31, 2022, now U.S. Pat. No. 11,907,175, which is a continuation of U.S. patent application Ser. No. 17/093,381, filed Nov. 9, 2020, now U.S. Pat. No. 11,526,472, which is a continuation of U.S. patent application Ser. No. 15/891,493, filed Feb. 8, 2018, now U.S. Pat. No. 10,866,936, which claims priority to U.S. Provisional Application Ser. No. 62/478,372, filed Mar. 29, 2017, the disclosures of which are incorporated herein in their entireties by reference.

TECHNICAL FIELD

The present disclosure generally relates to the technical field of special-purpose machines that facilitate model objects, including computerized variants of such special-purpose machines and improvements to such variants, and to the technologies by which such special-purpose machines become improved compared to other special-purpose machines that facilitate model objects. In particular, the present disclosure addresses systems and methods for a model object management and storage system.

BACKGROUND

Currently, users utilizing models, such as mathematical models, statistical models, linear regression models, etc., are storing the models they create locally or in a personal folder. There is no centralized repository and/or standardized method for saving and accessing models. As a result, these users are not able to utilize models previously created by other users and build off of a previously achieved state of the model. Further, performance of the model at various states cannot be analyzed.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
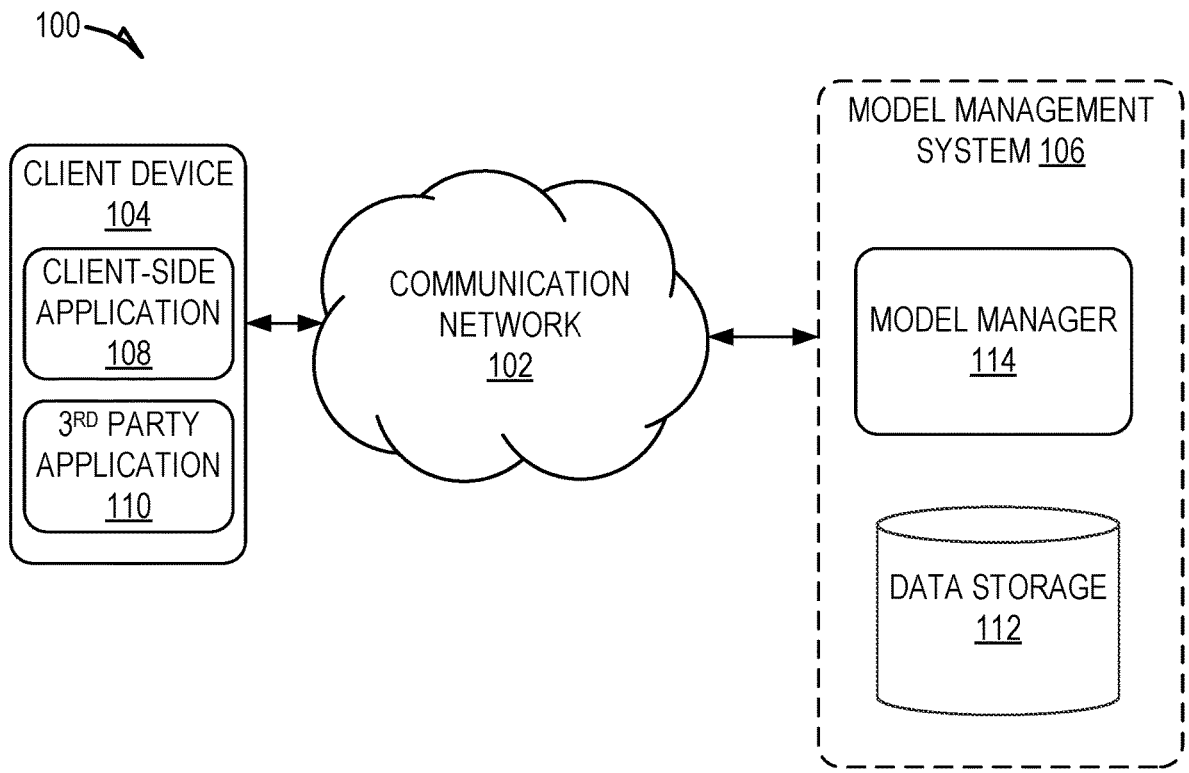
FIG. 1 shows an exemplary system for providing a centralized repository and standardized method for storing and accessing models, according to some example embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed are systems, methods, and computer-readable storage media for a model object management and storage system. A model management system provides a centralized repository and standardized method for storing and accessing models. The model management system generates a model key identifying a model and associates various versions (i.e., states) of the model with the model key. As a result, each version of the model can be easily accessed. Each state of the model is saved as a file that includes the set of functions defining the respective model state. The model management system associates the files with the corresponding model key. The model management system uses the model key to identify each associated file representing the various versions (i.e., states) of the model.

Modeling (e.g., mathematical modelling) is the process of using various mathematical structures (e.g., graphs, equations, diagrams, scatterplots, tree diagrams, etc.) to represent real world situations. A resulting model provides an abstraction that reduces a problem to its essential characteristics.

Models are useful for a variety of purposes. For example, models are useful tools for engineers studying the effects of traffic on a bridge, a telephone company that wants to know the best price to charge for long distance service, and social scientists that wish to predict trends in population and disease.

A model generally describes a system by a set of variables and a set of functions that establish relationships between the variables. Variables may be of many types, such as real or integer numbers, boolean values, strings, etc. Variables represent some known properties of the system, such as measured system outputs, timing data, counters, and event occurrence (yes/no). The model itself is the set of functions (e.g., equations) that describe the relations between the different variables. Each function includes one or more terms and/or operators. Terms in a model can include variables, parameters (i.e., constants), variables multiplied by parameters, variables multiplied by other variables, or describe connections between nodes and/or units (e.g., as in a decision tree or deep neural network). An operator is an operation to be performed between multiple terms in the function, such as add, subtract, etc.

Once a model has been created, it can be used to predict the performance of the system based on provided variables. For example, a user may enter a set of variables into the model to receive a determined output based on the set of functions that define the model. The determined output describes the expected performance of the system based on the entered variable. For example, an engineer studying the effects of traffic on a bridge can enter variables for number of cars, time of day and weather into a model describing traffic on the bridge to determine the expected traffic under the given conditions.

In some example embodiments, machine learning techniques may be used to automate the process of building models. By using algorithms to iteratively learn from data, a set of variables may be analyzed to determine the functions that describe the relations between the different variables. For example, a set of known variables describing traffic on a bridge (e.g., time of day, number of cars, weather, etc.) can be analyzed using machine learning to determine functions describing the relationships between the variables.

As more known data is analyzed using machine learning, the accuracy of the model improves. Accordingly, additional variable data can be analyzed after a model has been generated to continuously fine tune the set of functions that define the model. For example, the parameters (i.e., constants) in a function may be updated as additional known variable data is analyzed.

A model can therefore progress through multiple states based on the amount of variable data that has been analyzed to generate the model. Each state of the model is represented by the resulting set of functions defining the model in the state. For example, a model generated based on a first set of variable data is in a first state as defined by the resulting functions (e.g., parameters, operators, etc.) determined based on the first set of variables. As additional variable data is analyzed (e.g., a second set of variable data), the functions (e.g., parameters, operators, etc.) are fine-tuned (i.e., modified), resulting in a second state of the model.

As explained above, prior systems do not provide a centralized repository and/or standardized method for saving and accessing models. As a result, users cannot easily find previous states of a model generated by others users, which can be used to further refine the model.

FIG. 1 shows an exemplary system 100 for providing a centralized repository and standardized method for storing and accessing models. While system 100 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of system 100 are discussed in a singular sense, multiple instances of one or more of the various functional components may be employed.

As shown, system 100 can include multiple computing devices connected to communication network 102 and configured to communicate with each other through use of communication network 102. Communication network 102 can be any type of network, including a local area network ("LAN"), such as an intranet, a wide area network ("WAN"), such as the internet, or any combination thereof. Further, communication network 102 can be a public network, a private network, or a combination thereof. Communication network 102 can also be implemented using any number of communication links associated with one or more service providers, including one or more wired communication links, one or more wireless communication links, or any combination thereof. Additionally, communication network 102 can be configured to support the transmission of data formatted using any number of protocols.

Multiple computing devices can be connected to communication network 102. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIG. 5.

To facilitate communication with other computing devices, a computing device can include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As shown, system 100 includes client device 104 and model management system 106. In system 100, a user can interact with model management system 106 through client device 104 connected to communication network 102 by direct and/or indirect communication. Client device 104 can be any of a variety of types of computing devices that include at least a display, a computer processor, and communication capabilities that provide access to communication network 102 (e.g., a smart phone, a tablet computer, a personal digital assistant (PDA), a personal navigation device (PND), a handheld computer, a desktop computer, a laptop or netbook, or a wearable computing device).

Model management system 106 can consist of one or more computing devices and support connections from a variety of different types of client devices 104, such as desktop computers; mobile computers; mobile communications devices (e.g. mobile phones, smart phones, tablets, etc.); smart televisions; set-top boxes; and/or any other network enabled computing devices. Client device 104 can be of varying type, capabilities, operating systems, etc. Furthermore, model management system 106 can concurrently accept connections from and interact with multiple client devices 104.

A user can interact with model management system 106 via client-side application 108 installed on client device 104. In some embodiments, client-side application 108 can include a model management system 106 specific component. For example, the component can be a stand-alone application, one or more application plug-ins, and/or a browser extension. However, the user can also interact with model management system 106 via third-party application 110, such as a web browser, that resides on client device 104 and is configured to communicate with model management system 106. In either case, client-side application 108 and/or third party application 110 can present a user interface (UI) for the user to interact with model management system 106.

Model management system 106 can include data storage 112 to store data. The stored data can include any type of data, such as digital data, documents, text files, audio files, video files, etc. Data storage 112 can be a storage device, multiple storage devices, or one or more servers. Alternatively, data storage 112 can be a cloud storage provider or network storage. Model management system 106 can store data in a network accessible storage (SAN) device, in a redundant array of inexpensive disks (RAID), etc. Date storage 110 can store data items using one or more partition types, such as FAT, FAT32, NTFS, EXT2, EXT3, EXT4, ReiserFS, BTRFS, and so forth.

Model management system 106 includes model manager 114 configured to enable users to create, store and access models. A model is any type of model designed to describe a system, such as a mathematical model, linear regression model, logistic regression model, random forest model, etc.

Model manager 114 provides a user with a model management interface that enables a user to utilize functionality of the model management system 106. For example, the model management interface can include user interface elements (e.g., buttons, text boxes, etc.) to create new models, store models and access stored models.

Model manager 114 utilizes a model key to associate multiple versions of a model. A model key can be any type of unique identifier used to identify a model. For example, a model key can be a string, number, etc. Model manager 114 generates a model key for a new model created by a user. Model manager 114 stores the model key in data storage 112.

Once a model key has been generated, model manager 114 uses the model key to associate multiple versions of the model as well as identify available versions of the model. For example, upon a user selecting to store a created model, model manager 114 stores the model in data storage 112 and associates the stored model with the corresponding model key. Accordingly, each version of the model will be associated via the model key.

To store a new version of a model, model manager 114 generates a new file that includes the set of functions defining the model state. The new file includes equations, terms, parameters, operators, etc., that were determined using machine learning on a set of known variables. The functions can be stored in a standardized format to allow cross language utilization, however the present disclosure supports both language agnostic and language specific parameter stores. Model manager 114 stores the generated file in data storage 112 and associates the file with its corresponding model key. The file can be any type of file. For example, in some embodiments, the file is a JavaScript Object Notation (JSON) file.

Model manager 114 may also associate metadata with the stored file, such as a version number, timestamp, creating user, etc. Modelling libraries corresponding to the model may also be stored in data storage 112 and associated with the model key.

Model manager 114 also uses the model keys to present a user with available models. For example, model manager 114 uses the model keys to presents a listing of the models maintained by model management system 106. The listing of models is presented in the model management interface, which enables a user to view the available models as well as select a desired model to work with. Upon receiving a user selection selecting a presented model, model manager 114 uses the corresponding model key to identify the associated versions of the selected model. Model manager 114 then presents a listing of the available versions of the model in the model management interface.

In some embodiments, model manager 114 generates a model architecture file associated with each model. The model architecture file describes the pipeline and/or progression of the model. For example, the model architecture file may list each version of the model, the dates the version of the model was created, a user associated with each version of the model, the set of functions defining the model state of each version of the model, etc. Additionally, the model architecture file may include links to each version of the model. A user can therefore access the model architecture file to view the progression of the model and select a listed model to access the model. Model manager 114 stores the generated model architecture file in data storage 112 and associates the model architecture file with the corresponding model key.

A user can select a desired version of the model presented in the model management interface or the model architecture file to further build on the model, generate a variation of the model, etc. A user may also select to view performance of the model across multiple versions. Model manager 114 can generate performance data, graphs, etc., based on data gathered from two or more versions of the model. For example, model manager 114 can present changes to the functions defining the model across multiple versions (e.g., states) of the model. This can include presenting changes to parameters (i.e., constants) included in the functions.

Model manager 114 stores generated performance data, graphs, etc., in a similar fashion as the models themselves. For example, model manager 114 stores the generated performance data, graphs, etc., in data storage 112 and associates the performance data, graphs, etc., with the corresponding model key, which is used by model manager 114 to access the stored performance data, graphs, etc. Further, the model manager 114 can include data describing the performance data, graphs, etc., to the model architecture file and add links to the model architecture file to access the performance data, graphs, etc.

Figure 2:
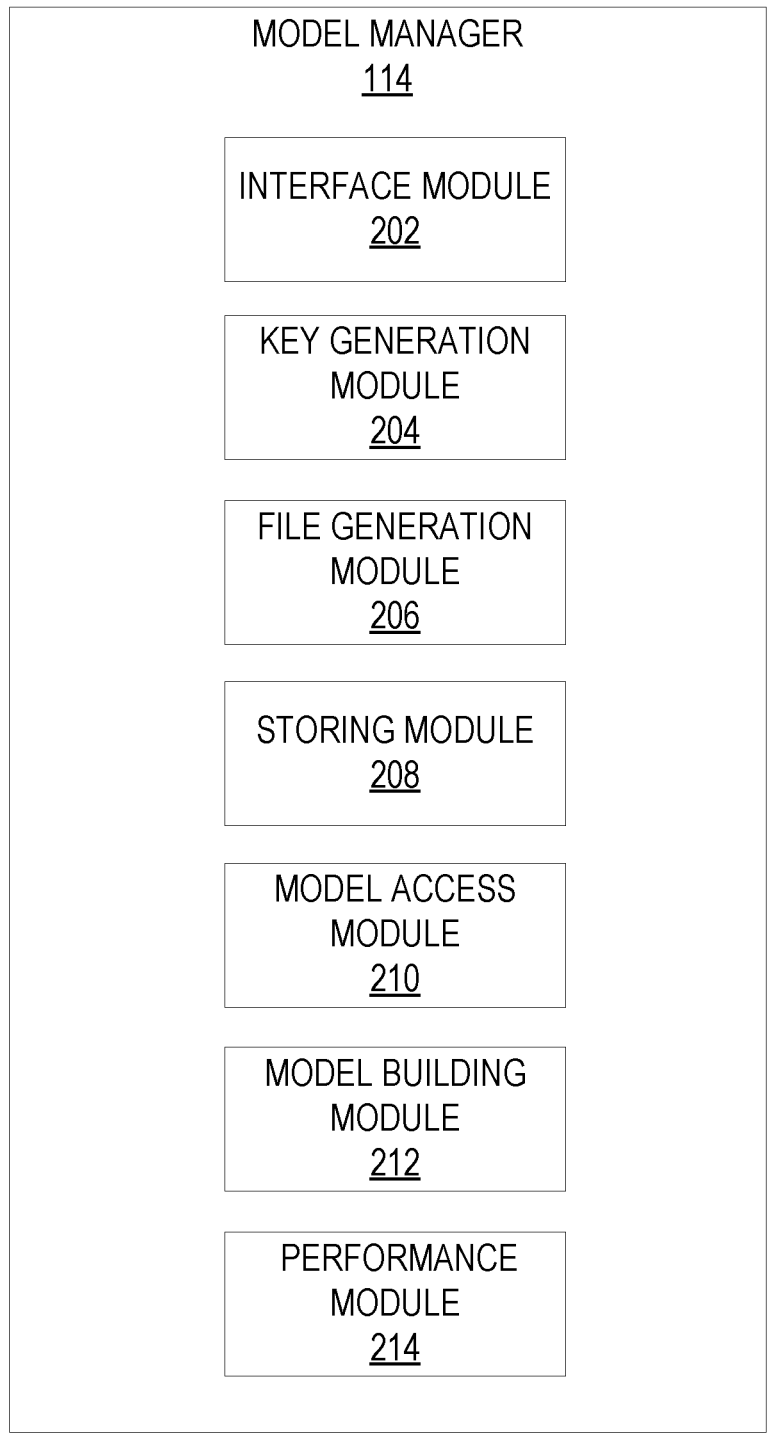
FIG. 2 shows an example block diagram of a model manger, according to some example embodiments.

FIG. 2 shows an example block diagram of model manger 114. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by query manager 120 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, model manger 114 includes interface module 202, key generation module 204, file generation module 206, storing module 208, model access module 210, model building module 212 and performance module 214.

Interface module 202 provides a user with a model management interface that enables the user to create, store and access models. The model management interface provides the user with user interface elements, such as text boxes, buttons, check boxes, etc., that allow a user to select from various functionality provided by model management system 106. For example, the model management interface includes user interface elements that a user can utilize to select to create, store or access models. As another example, the model management interface can present a listing of available models and corresponding versions of the model, thereby enabling the user to view and/or select available models.

Further, the model management interface may include a click to score button that enables a user to apply a selected version of a model to a compatible dataset to produce a scored dataset. For example, the click to score button, upon being selected, may cause the user to be prompted to first select a model from a list of available models. Upon the user selecting a model, the user may then be presented with a listing of available datasets to choose from to generate the scored dataset. Alternatively, in some embodiments, the user may first select a listed model and dataset and then select the click to score button to generate the scored dataset.

Key generation module 204 generates a model key for a new model. A model key is any type of identifier used to identify a model, such as a string, integer, etc. In some embodiments, key generation module 204 generates a unique model key for a newly created model. Alternatively, in some embodiments, key generation module 204 utilizes a model key provided by a user. For example, key generation module 204 can cause the interface module to query a user to provide a model key for a new model.

In some embodiments, key generation module 204 stores generated model keys in data storage 112. Data storage 112 may store a model key index listing the generated model keys. Key generation module 204 communicates with data storage 112 to modify the model key index to add a newly generated key. For example, key generation module 204 creates a new entry in the model key index that includes the generated model key.

File generation module 206 generates a file to save a version (e.g., state) of a model. The file includes the set of functions defining the model state. The new file includes equations, terms, parameters, operators, etc., that were determined using machine learning on a set of known variables. The functions are stored in a standardized format to allow cross language utilization. The file can be any type of file. For example, in some embodiments, the file is a JavaScript Object Notation (JSON) file.

File generation module 206 can further generate metadata associated with the file that describes the file. The metadata can include any type of data describing the file and/or the model state represented by the file. For example, the metadata can include a model name, version number, creation date, creating user, description of the model, etc.

Storing module 208 stores the generated file in data storage 112 and associates the file with its corresponding model key. The stored file can be associated with the model key using any of a number of known techniques. For example, storing module 208 can associate the stored file with the model key by updating the model key index in data storage 112 to indicate that the file is associated with a corresponding model key. In this type of embodiment, storing module 208 searches for the corresponding model key in the model key index and updates the associated entry to include data identifying the file. This can include a pointer to the file, an identifier for the file, etc.

As another example, storing module 208 can store the model key with the file. For example, storing module 208 can update metadata associated with the file to include the model key.

Model access module 210 provides access to models maintained by model management system 106. Model access module 210 communicates with data storage 112 to access model keys stored in data storage 112. For example, model access module 210 accesses the model key index and provides data identifying the models to interface module 202 to provide a listing of available models to a user. A user can use the provided listing to select a model to interact with.

Model access module 210 provides users with the available versions of a selected model. For example, model access module 210 identifies the files associated with a model key to identify the saved versions of the model. Model access module 210 provides data associated with the identified files to interface module 202 to be presented on the model management interface. For example, the data can include version numbers, creation dates, descriptions, creating users, etc. A user can therefore browse the various versions of a model and select models to utilize.

Model building module 212 enables a user to create a new model. For example, model building module 212 enables a user to build either a completely new model or new model from an existing model (e.g., a new version of the model). Model building module 212 provides tools enabling a user to visually train a model, develop featurization, vectorization, modeling algorithms, etc.

Performance module 214 provides functionality to analyze performance of a model over multiple versions. For example, performance module 214 enables users to view data indicating changes to the functions, equations, parameters, etc., that represent the model. A user can therefore monitor and analyze changes, trends, etc., in the model across multiple versions.

Figure 3:
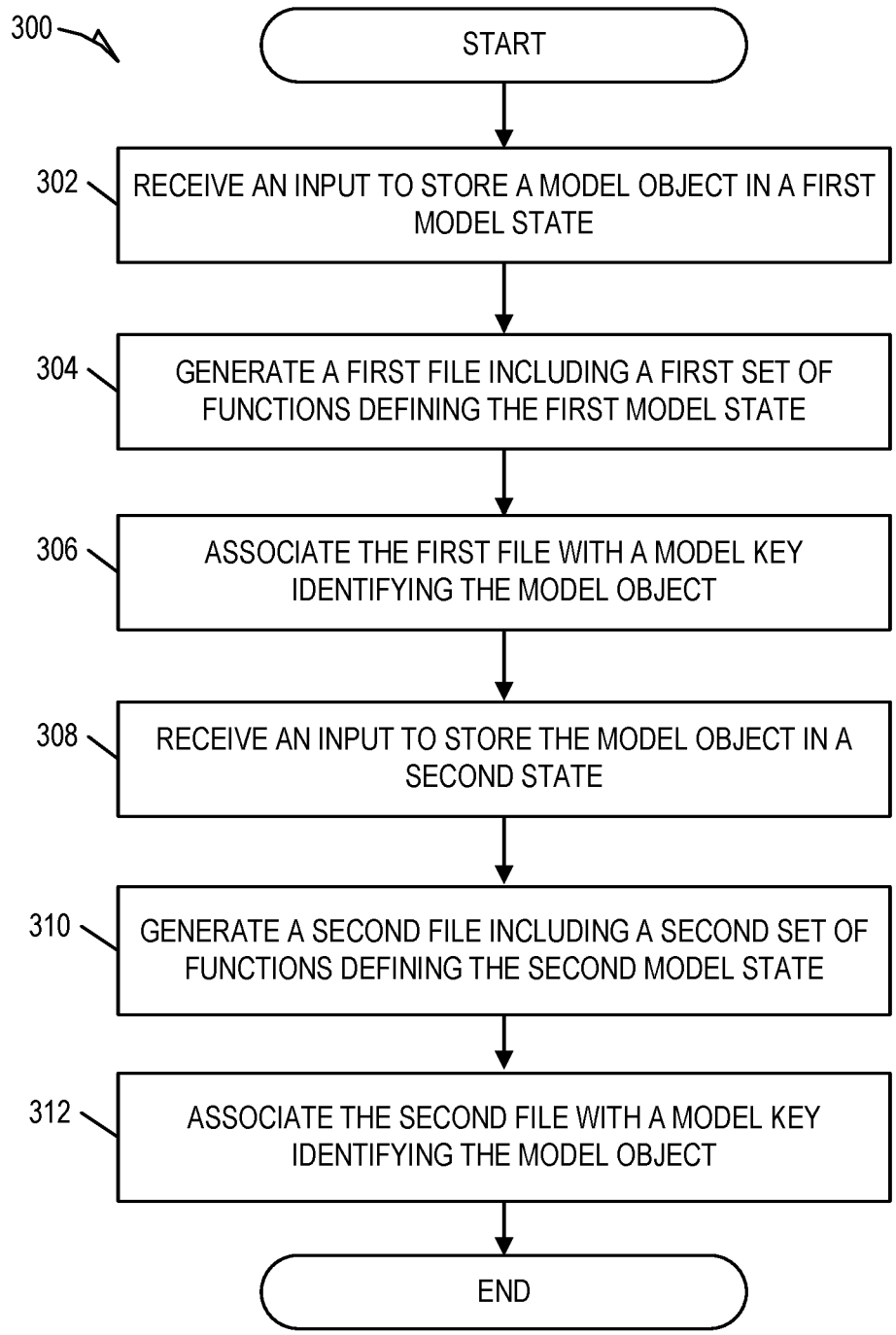
FIG. 3 shows an example method for storing a model in a centralized repository, according to some example embodiments.

FIG. 3 shows an example method for storing a model in a centralized repository, according to some example embodiments. Method 300 may be embodied in computer readable instructions for execution by one or more processors such that the operations of method 300 may be performed in part or in whole by model manager 114; accordingly, method 300 is described below by way of example with reference thereto. However, it shall be appreciated that at least some of the operations of method 300 may be deployed on various other hardware configurations and method 300 is not intended to be limited to model manager 114.

At operation 302, interface module 202 receives an input to store a model object in a first model state. The first model state can be generated by model building module 212 based on a first set of known variables. For example, model building module 212 generates the first set of functions using machine learning based on the first set of known variables. The first set of functions define the model object. For example, the first set of functions includes equations, parameter, operators, etc., that define the relationships between the variables.

At operation 304, file generation module 206 generates a first file including a first set of functions defining the first model state. The first file can be any type of file. For example, in some embodiments, the first file is a JSON file.

At operation 306, storing module 208 associates the first file with a model key identifying the model object. The model key is a string, integer, etc., that uniquely identifies the model object. Key generation module 204 generates the model key identifying the model object when the model object is initially created (e.g., when a user selects to create a first version of a new model, when a user selects to save a first version of a new model, etc.)

Storing module 208 stores the first file in data storage 112 and associated the first file with the model key. For example, storing module 208 can update a model key index stored in data storage 112 to indicate that the first file is associated with the model key. As another example, storing module 208 appends metadata to the first file indicating that the first file is associated with the model key. For example, the first file can be appended with the model key (e.g., characters, integers, etc.) itself.

At operation 308, interface module 202 receives an input to store the model object in a second model state. The second model state can be generated by model building module 212 based on the model object in the first model state and a second set of known variables that are different than the first set of known variables. For example, model building module 212 generates the second set of functions using machine learning based on the first state of the model object and the second set of known variables. The second set of functions includes updated equations, parameter, operators, etc., that define the relationships between the variables. For example, the second set of functions may include an updated parameter determined based on the second set of known variables.

At operation 310, file generation module 206 generates a second file including a second set of functions defining the second model state. The second file can be any type of file. For example, in some embodiments, the second file is a JSON file.

At operation 312, storing module 208 associates the second file with the model key identifying the model object. The second file is associated with the model key identifying the model object because the second state of the model object is updated version of the model object. Storing module 208 stores the second file in data storage 112 and associated the second file with the model key. For example, storing module 208 updates the model key index stored in data storage 112 to indicate that the second file is associated with the model key. As another example, storing module 208 appends metadata to the first file indicating that the second file is associated with the model key. For example, the second file can be appended with the model key (e.g., characters, integers, etc.) itself.

Although method 300 only describes only two versions of the model object being created and associated with the model key, this is only for ease of explanation and not meant to be limiting. Any number of versions of the model object can be generated and associated with the model key, and this disclosure anticipates any such embodiments.

Figure 4:
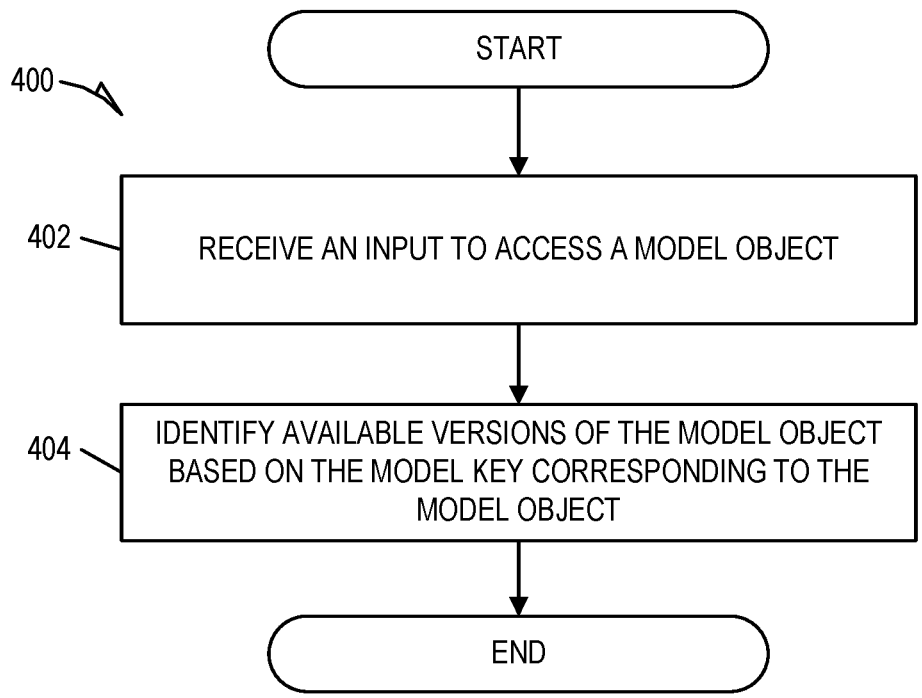
FIG. 4 shows an example method for accessing multiple versions of a model stored in a centralized repository, according to some example embodiments.

FIG. 4 shows an example method for accessing multiple versions of a model stored in a centralized repository, according to some example embodiments. Method 400 may be performed as part of method 300. For example, method 400 may be performed after operation 312. Method 400 may be embodied in computer readable instructions for execution by one or more processors such that the operations of method 400 may be performed in part or in whole by query manager 120; accordingly, method 400 is described below by way of example with reference thereto. However, it shall be appreciated that at least some of the operations of method 400 may be deployed on various other hardware configurations and method 400 is not intended to be limited to query manager 120.

At operation 402, interface module 202 receives an input to access a model object. The input can be the result of use utilizing the model management interface to select to access the model object.

At operation 404, model access module 210 identifies available versions of the model object based on the model key corresponding to the model object. In some embodiments, model access module 210 accesses the model key index in data storage 114 to identify the files associated with the model key. As another example, model access module 210 searches data storage 114 for model objects that have been appended with the model key.

The model access module 210 can provide data identifying the various versions of the model object to interface module 202. Interface module 202 can then present the data to the user in the model management interface. A user uses the data presented in the model management interface to view the available versions of the model and select to interact with one or more versions. For example, a user can select to build off of a version of the model.

As another example, the user can select to evaluate performance of the model object across multiple versions. For example, in response to interface module 202 receiving an input to evaluate performance of the model object, performance module 214 generates a report based on the set of functions defining the various states of the model object. The report can indicate changes from one version to the next, such as changes to parameters in the functions.

Figure 5:
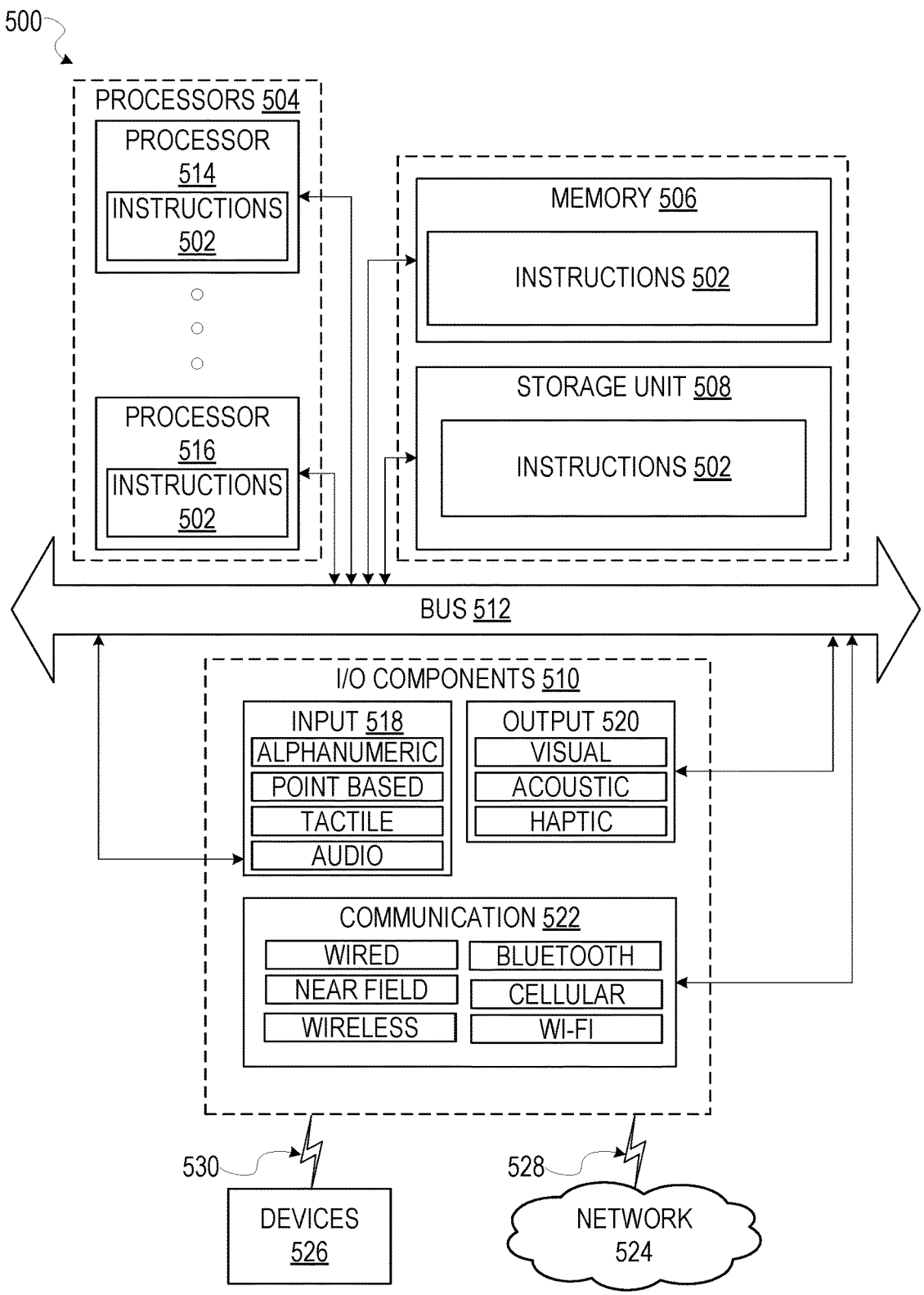
FIG. 5 shows a diagrammatic representation of a computing device in the example form of a computer system within which a set of instructions for causing the computing device to perform any one or more of the methodologies discussed herein may be executed.

FIG. 5 shows a block diagram illustrating components of a computing device 500, according to some example embodiments, able to read instructions from a machine-readable medium (e.g., a machine-readable storage medium) and perform any one or more of the methodologies discussed herein. Specifically, FIG. 5 shows a diagrammatic representation of computing device 500 in the example form of a system, within which instructions 502 (e.g., software, a program, an application, an applet, an app, a driver, or other executable code) for causing computing device 500 to perform any one or more of the methodologies discussed herein may be executed. For example, instructions 502 include executable code that causes computing device 500 to execute method 300 and 400. In this way, these instructions transform the general, non-programmed machine into a particular machine programmed to carry out the described and illustrated functions in the manner described herein. Computing device 500 may operate as a standalone device or may be coupled (e.g., networked) to other machines.

By way of non-limiting example, computing device 500 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing instructions 502, sequentially or otherwise, that specify actions to be taken by computing device 500. Further, while only a single computing device 500 is illustrated, the term "machine" shall also be taken to include a collection of computing devices 500 that individually or jointly execute instructions 502 to perform any one or more of the methodologies discussed herein.

Computing device 500 may include processors 504, memory 506, storage unit 508 and I/O components 510, which may be configured to communicate with each other such as via bus 512. In an example embodiment, processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 514 and processor 516 that may execute instructions 502. The term "processor" is intended to include multi-core processors that may comprise two or more independent processors (sometimes referred to as "cores") that may execute instructions contemporaneously. Although FIG. 5 shows multiple processors, computing device 500 may include a single processor with a single core, a single processor with multiple cores (e.g., a multi-core process), multiple processors with a single core, multiple processors with multiples cores, or any combination thereof.

Memory 506 (e.g., a main memory or other memory storage) and storage unit 508 are both accessible to processors 504 such as via bus 512. Memory 506 and storage unit 508 store instructions 502 embodying any one or more of the methodologies or functions described herein. In some embodiments, database 516 resides on storage unit 508. Instructions 502 may also reside, completely or partially, within memory 506, within storage unit 508, within at least one of processors 504 (e.g., within the processor's cache memory), or any suitable combination thereof, during execution thereof by computing device 500. Accordingly, memory 506, storage unit 508, and the memory of processors 504 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 502. The term "machine-readable medium" shall also be taken to include any medium, or combination of multiple media, that is capable of storing instructions (e.g., instructions 502) for execution by a machine (e.g., computing device 500), such that the instructions, when executed by one or more processors of computing device 500 (e.g., processors 504), cause computing device 500 to perform any one or more of the methodologies described herein (e.g., method 300 and 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine will depend on the type of machine. For example, portable machines such as mobile phones will likely include a touch input device or other such input mechanisms, while a headless server machine will likely not include such a touch input device. It will be appreciated that I/O components 510 may include many other components that are not specifically shown in FIG. 5. I/O components 510 are grouped according to functionality merely for simplifying the following discussion and the grouping is in no way limiting. In various example embodiments, I/O components 510 may include input components 518 and output components 520. Input components 518 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. Output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 510 may include communication components 522 operable to couple computing device 500 to network 524 or devices 526 via coupling 528 and coupling 530, respectively. For example, communication components 522 may include a network interface component or other suitable device to interface with network 524. In further examples, communication components 522 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1126 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A model management system comprising:
one or more memories having instructions stored thereon; and
one or more processors configured to execute the instructions and perform operations comprising:
identifying, based on an input, a first model state and a second model state corresponding to a model object, the first model state being generated based on a first set of known variables, and the second model state being generated based on the model object in the first model state and a second set of known variables; and
generating a representation of data indicative of a set of model states of the model object, the set of model states including the first model state and the second model state.

2. The model management system of claim 1, wherein the first model state of the model object includes a first set of functions, and the second model state of the model object includes a second set of functions.

3. The model management system of claim 2, wherein the operations further comprising:
generating the first set of functions based on the first set of known variables, the first set of functions including a first parameter; and
generating the second set of functions based on the first model state and the second set of known variables, the second set of functions including an updated first parameter that is different than the first parameter.

4. The model management system of claim 3, wherein the operations further comprise:
receiving an input to evaluate performance of the model object; and
generating a report based on the first set of functions and the second set of functions, the report indicating a change between the first parameter and the updated first parameter.

5. The model management system of claim 3, wherein the operations further comprise:
generating a third set of functions based on the second model state and a third set of known variables, the third set of functions defining a third model state of the model object and including a second updated first parameter that is different than the updated first parameter.

6. The model management system of claim 5, wherein the operations further comprise:
receiving an input to store the model object in the third model state;
generating a third file including the third set of functions defining the third model state; and
associating the third file with a model key identifying the model object.

7. The model management system of claim 1, wherein the operations further comprise:
receiving an input to store the model object in the first model state;
generating a first file including a first set of functions defining the first model state;
associating the first file with a model key identifying the model object;

receiving an input to store the model object in the second model state;
generating a second file including a second set of functions defining the second model state; and
associating the second file with the model key identifying the model object.

8. The model management system of claim 7, wherein the first file and the second file are both JavaScript Object Notation files.

9. The model management system of claim 1, wherein the model object includes a machine learning model.

10. A method comprising:
identifying, based on an input, a first model state and a second model state corresponding to a model object, the first model state being generated based on a first set of known variables, and the second model state being generated based on the model object in the first model state and a second set of known variables; and
generating a representation of data indicative of a set of model states of the model object, the set of model states including the first model state and the second model state;
wherein the method is performed using one or more processors.

11. The method of claim 10, wherein the first model state of the model object includes a first set of functions, and the second model state of the model object includes a second set of functions.

12. The method of claim 11, further comprising:
generating the first set of functions based on the first set of known variables, the first set of functions including a first parameter; and
generating the second set of functions based on the first model state and the second set of known variables, the second set of functions including an updated first parameter that is different than the first parameter.

13. The method of claim 12, further comprising:
receiving an input to evaluate performance of the model object; and
generating a report based on the first set of functions and the second set of functions, the report indicating a change between the first parameter and the updated first parameter.

14. The method of claim 12, further comprising:
generating a third set of functions based on the second model state and a third set of known variables, the third set of functions defining a third model state of the model object and including a second updated first parameter that is different than the updated first parameter.

15. The method of claim 14, further comprising:
receiving an input to store the model object in the third model state;
generating a third file including the third set of functions defining the third model state; and
associating the third file with a model key identifying the model object.

16. The method of claim 10, further comprising:
receiving an input to store the model object in the first model state;
generating a first file including a first set of functions defining the first model state;
associating the first file with a model key identifying the model object;
receiving an input to store the model object in the second model state;

generating a second file including a second set of functions defining the second model state; and associating the second file with the model key identifying the model object.

17. The method of claim 16, wherein the first file and the second file are both JavaScript Object Notation files.

18. The method of claim 10, wherein the model object includes a machine learning model.

19. A non-transitory computer-readable medium storing instructions that, when executed by one or more processors, cause the one or more processors to perform operations comprising:

identifying, based on an input, a first model state and a second model state corresponding to a model object, the first model state being generated based on a first set of known variables, and the second model state being generated based on the model object in the first model state and a second set of known variables; and generating a representation of data indicative of a set of model states of the model object, the set of model states including the first model state and the second model state.

20. The non-transitory computer-readable medium of claim 19, wherein the first model state of the model object includes a first set of functions, and the second model state of the model object includes a second set of functions.

* * * * *